(12) United States Patent
Su et al.

(10) Patent No.: US 10,019,386 B2
(45) Date of Patent: Jul. 10, 2018

(54) INTERFACE DETECTION CIRCUIT

(71) Applicant: NXP B.V., Eindhoven (NL)

(72) Inventors: Chiahung Su, Chandler, AZ (US);
Madan Mohan Reddy Vemula, Tempe, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/705,631

(22) Filed: May 6, 2015

(65) Prior Publication Data

US 2016/0328337 A1 Nov. 10, 2016

(51) Int. Cl.
| | |
|---|---|
| G06F 3/00 | (2006.01) |
| G06F 12/14 | (2006.01) |
| G06F 13/12 | (2006.01) |
| G06F 13/38 | (2006.01) |
| G06F 11/30 | (2006.01) |
| G06F 11/22 | (2006.01) |

(52) U.S. Cl.
CPC ........ G06F 13/126 (2013.01); G06F 11/2247 (2013.01); G06F 11/3051 (2013.01); G06F 13/385 (2013.01)

(58) Field of Classification Search
CPC . G06F 3/00; G06F 13/00; G06F 12/02; G06F 12/14
USPC .......................................................... 710/14
See application file for complete search history.

(56) References Cited

U.S. PATENT DOCUMENTS

| | | | |
|---|---|---|---|
| 5,802,390 A * | 9/1998 | Kashiwagi | .......... G06F 13/4077 326/30 |
| 7,268,561 B2 | 9/2007 | Zhu | |
| 8,244,927 B2 * | 8/2012 | Chadbourne | ....... G06F 11/3051 710/15 |
| 8,412,268 B2 | 4/2013 | Inha et al. | |
| 8,625,029 B2 | 1/2014 | Doyle et al. | |
| 2011/0193632 A1 * | 8/2011 | Kato | .................... H03F 3/45183 330/254 |
| 2012/0144088 A1 * | 6/2012 | Chen | .................... G06F 13/4269 710/316 |
| 2013/0275779 A1 | 10/2013 | He | |
| 2015/0084693 A1 * | 3/2015 | Larson | ................ H03F 3/45475 330/254 |
| 2016/0004646 A1 * | 1/2016 | Maeda | .................... G06F 21/62 713/193 |

FOREIGN PATENT DOCUMENTS

EP 2028854 B1 7/2011

* cited by examiner

*Primary Examiner* — Ernest Unelus
*Assistant Examiner* — Getente A Yimer

(57) ABSTRACT

One or more characteristics of devices are ascertained in accordance with one or more aspects of the disclosure. As may be consistent with one or more embodiments, the attachment of an external circuit to an input port is detected based on a resistance value presented by the external circuit. A resistance range that includes the resistance value presented at the input port is determined, in response to detecting the attachment, by dynamically coupling one or more of a plurality of resistor-based circuits relative to the input port. A signal presented by the external circuit on the input port is coded based on the determined resistance range, using one or more of the resistor-based circuits, and the code is used to identify a type of the external circuit. These aspects can provide for the communication of power and data with a variety of different types of external circuits.

20 Claims, 5 Drawing Sheets

INTERFACE DETECTION CIRCUIT

Aspects of various embodiments are directed to communications, and to interface circuitry that communicates with different types of circuits.

Various types of circuitry operate to interface with different types of circuits, which may be connected to a common port. For instance, portable computers or mobile devices such as telephones or tablets often employ a common type of interface port that can be coupled to a variety of different types of external devices. Such external devices may include, for example, storage devices, cameras, power chargers, video monitors, keyboards, and wireless communication devices. Some mobile interface devices perform multi-channel signal switching for a variety of accessories, such as with USB2.0 and UART signals. The accessories include BC1.2, USB OTG, factory testing mode accessories, UART cable, customer accessories and reserved accessories. For such applications, it can be important to identify the type of device connected to the interface port.

Some approaches to device identification in these contexts can be challenging to implement. For example, resistances presented at an interface port can be indicative of a type of device that is connected to the port. However, variations in resistance can make detection in this regard challenging. Further, many accessories have operational modes that result in different resistances being presented at such an interface port. Incorrectly detecting a type of an external device may lead to undesirable effects.

These and other matters have presented challenges to communications, for a variety of applications.

Various example embodiments are directed to interface circuits, devices, related methods and their implementation.

According to an example embodiment, an apparatus includes an input port, a sorting circuit and a coding circuit. The input port is operable to communicate power and data with different types of external circuits that respectively provide a resistance value at the input port that is different than resistance values presented at the input port by each other one of the external circuits. The sorting circuit operates to detect, in a connection detection mode, attachment of an external circuit to the input port based on a resistance value presented by the external circuit on the input port. In response to detecting the attachment of the external circuit, the sorting circuit switches from the first mode to a second tuning mode in which a resistance range that includes the resistance value presented at the input port is determined, by dynamically coupling one or more of a plurality of resistor-based circuits relative to the input port. The coding circuit operates with the sorting circuit to code a signal presented by the detected external circuit on the input port based on the determined resistance range, using the one or more of the plurality of resistor-based circuits. The type of the external circuit can be identified based on the coding.

One or more embodiments involve a method as follows. In a first mode, attachment of an external circuit to an input port is detected based on a resistance value presented by the external circuit on the input port, and a switch from the first mode to a second mode is made in response to detecting the attachment of the external circuit. While in the second mode, a resistance range that includes the resistance value presented at the input port is determined by dynamically coupling one or more of a plurality of resistor-based circuits relative to the input port. A signal presented by the detected external circuit is coded based on the determined resistance range (using the one or more of the resistor-based circuits), and a type of the external circuit can be identified based on the coding. This coding (and resulting identification) can then be used for communicating power and data with the external circuit.

Consistent with one or more apparatus and/or method-based embodiments, the attachment of an external circuit to an input port is detected based on a resistance value presented by the external circuit. A resistance range that includes the resistance value presented at the input port is determined, in response to detecting the attachment, by dynamically coupling one or more of a plurality of resistor-based circuits relative to the input port. A signal or other value presented by the external circuit on the input port is coded based on the determined resistance range, using one or more of the resistor-based circuits, and the code is used to identify a type of the external circuit. This approach can be carried out using, for example, first, second and third circuits respectively for the steps involving detection an external circuit, determining a resistance range for the circuit, and coding a signal for and/or identifying an external circuit. These aspects can provide for the communication of power and data with a variety of different types of external circuits. In some implementations, the external circuit is identified by comparing the coded signal with stored codes specifying different types of external circuits that respectively provide a resistance value that is different than resistance values presented by each other one of the plurality of different types of external circuits. The type of the external circuit is thus identified as one of the different types stored in connection with one of the stored codes that matches the coding.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
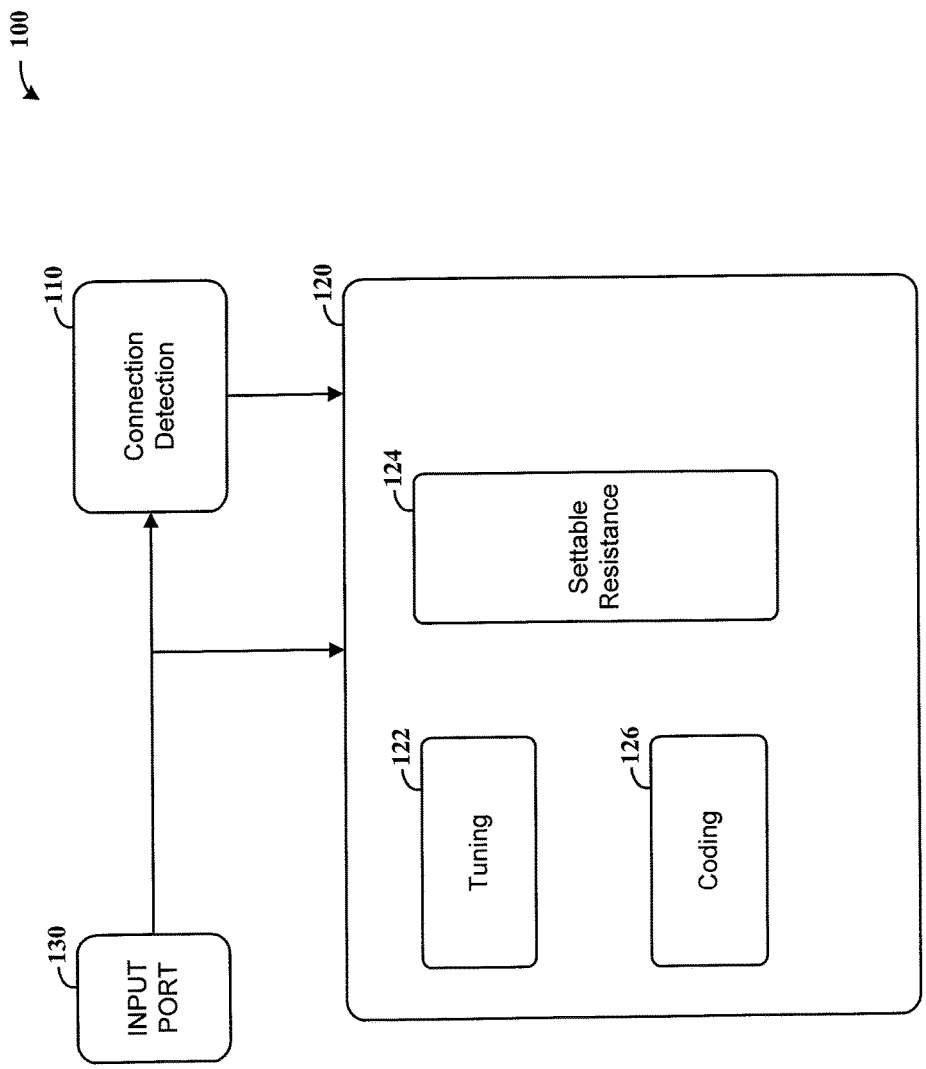
FIG. 1 shows an interface apparatus, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving the detection of a type of device connected to an input port, as may be applicable to the connection of various portable devices, peripheral devices and others via a common type of communication and/or power link. In certain implementations, aspects of the present disclosure have been shown to be beneficial when used in the context of accurately detecting a resistance presented by an external device and therein identifying the device, and to doing so in an efficient manner. While not necessarily so limited, various aspects may be appreciated through a discussion of examples using such exemplary contexts.

In accordance with various embodiments as may relate to the above, aspects of the present disclosure facilitate detection of devices at ultra-low quiescent current, using a crude resistor detection and check for any pull down (e.g., less than 3 megaohms), in response to which fine resistor detection is enabled. During fine resistor detection, a resistance range is identified in which the pull-down resistance falls, followed by a fine-tuning approach for accurate resistor detection within the range. Using these approaches, a device type of plug-in resistive accessory can be detected, which may be implemented under conditions in which the resistance varies (e.g., from 3% to 25%), and for detecting a wide variety of resistances (e.g., which varies over four decades, such as hundreds of ohms to megaohms). In various implementations, a variety of resistance-based circuits are coupled accordingly, with a number of partitions/ranges of resistors being scalable to suit particular embodiments. Further, fine detection, which may be implemented with a resistive analog-to-digital converter (ADC), can be scaled in resolution to the particular application. For instance, various implementations are carried out with high accuracy and low variation with different voltage and temperature (e.g. utilizing 7 different trimmed resistors, which in some embodiments are implemented to reduce process variations from about 40% down to less than 1%).

According to another example embodiment, an apparatus includes one or more circuits that operate with an input port to communicate power and data with different types of external circuits. A type of each circuit is identified based upon respective resistance values that each circuit presents at an input port, in which different circuit types present different resistance values. In response to detecting the attachment of a device to the input port (e.g., based on a detectable change in resistance or other characteristic of the input port), a resistance range that includes the resistance value presented at the input port is determined by dynamically coupling one or more resistor-based circuits relative to the input port. For instance, a voltage level of the input port can be detected under different conditions relating to the coupling of the resistor-based circuits (e.g., by dynamically closing one or more of switches S0-S6 in FIG. 4). A signal presented by the detected external circuit on the input port (e.g., a resulting voltage) can be coded based on the determined resistance range, using one or more of the resistor-based circuits. The type of the external circuit can then be identified based on the coding, and related communications and/or power transmission can be carried out in accordance with the identification.

In some embodiments, the one or more circuits are operated with a sorting circuit and coding circuit, with the sorting circuit determining the resistance range and the coding circuit coding the signal (and, e.g., may also identify the type of external circuit). These circuits may be implemented as discussed herein. For instance, in some embodiments, the sorting circuit includes switches for each resistor-based circuit, which selectively couple the resistor-based circuits to the input port. The resistance range is determined by closing one or more of the switches and therein dynamically coupling one or more of the resistor-based circuits to the input port. Each of the resistor-based circuits may, for instance, respectively exhibit different resistance values relative to other ones of the plurality of resistor-based circuits, which can facilitate the identification of external circuit resistances in various ranges, with a high degree of accuracy (e.g., within about 1%). The resistance value on the input port can thus be compared to a reference resistance value (e.g., by comparing a voltage on the input port relative to a known resistance of the resistor-based circuits, and thus determining the resistance range).

In certain embodiments, each resistor-based circuit is tuned to facilitate accurate detection. For instance, each resistor-based circuit may be implemented with a plurality of resistors, which are trimmed by selectively coupling one or more of the resistors based on a predefined resistance presented at the input port. The resistor-based circuits may also be implemented with one or more variable resistors, which can be tuned or trimmed by varying a resistance thereof.

In various embodiments, a signal or value presented on the input port is coded by respectively closing switches coupling the resistance-based circuits to the input port while other ones of the switches are left open. For each switch, a resistance value corresponding to the input port and the switch is compared with predetermined resistance values, and a code is generated with respective bits corresponding to the comparison for each switch.

In certain implementations, a resistor divider circuit provides a reference voltage that is used by a comparator (e.g., with respective inputs coupled to the reference voltage and input port/resistor-based circuits). The comparator compares a voltage presented at the first and second inputs while the respective switches are sequentially connected. The resistance range is determined in response to an output of the comparator transitioning values as respective ones of the resistor-based circuits are connected (e.g., as may be applicable to a threshold).

In some embodiments, coding and sorting circuits as discussed above code a signal presented on an input port by generating respective bits corresponding to a comparison between a reference voltage and a voltage corresponding to one of the resistor-based circuits and the input port, the value of the respective bits providing an indication of a code assigned to a particular type of the external circuit. In particular embodiments, the coding circuit includes a digital SAR (successful approximation register) circuit that varies a reference voltage at respective predetermined levels, and encodes a signal presented by the external circuit into a binary code having respective bits corresponding to each predetermined level of the reference voltage.

In certain embodiments, the resistor-based circuits are set (e.g., tuned or calibrated) by coupling a known resistance to the input port, comparing a voltage value corresponding to the known resistance and the resistor-based circuit to a reference voltage value, and setting a value of the resistor-based circuit by trimming the resistor-based circuit based on the comparing.

One or more embodiments involve a method as implemented in accordance with the various apparatus-based embodiments as discussed herein. In some embodiments, attachment of an external circuit to an input port is detected based on a resistance value presented by the external circuit on the input port. Once an external circuit is detected as being attached, a resistance range in which the resistance value lies is determined by dynamically coupling one or more resistor-based circuits relative to the input port (e.g., in a resistor-divider arrangement). A signal or voltage presented by the detected external circuit is coded based on the determined resistance range (using the one or more of the resistor-based circuits), and a type of the external circuit is identified based on the coding. This coding (and resulting identification) can then be used for communicating power and data with the external circuit. Identifying the type of the external circuit may, for example, include comparing the coding with stored codes specifying a plurality of different types of external circuits that respectively provide different, detectable resistance values at the input port. Accordingly, the type of the external circuit can be identified as being one of the plurality of different types stored in connection with one of the stored codes that matches the coding.

Turning now to the Figures, FIG. 1 shows an interface apparatus 100 as may be implemented for device-type detection, in accordance with one or more embodiments. The apparatus 100 includes connection detection circuit 110 and a tuning circuit 120 that respectively detect and identify external devices coupled to an input port 130. When the connection detection circuit 110 senses that an external device is connected to the input port 130 (e.g., via a change in resistance), the tuning circuit 120 is operated as follows.

A tuning circuit 112 determines a range of resistance that encompasses the resistance presented at the input port 130 by the external device, using the settable resistance circuit 124. For instance, the settable resistance circuit 124 may be implemented with respective resistance-based circuits that each cover a particular range of resistance, and trimming circuitry that sets/adjusts the value of each resistance-based circuit. This approach may be used, for example, to first determine a resistance range in which the resistance on the input port 130 lies, and then to fine-tune the settable resistance circuit relative to the resistance on the input port (e.g., within about 1%).

After the tuning circuit has trimmed the settable resistance circuit 124, the coding circuit 126 operates to code a value that is indicative of a type of the external device, based on the resistance provided by the external device and the tuned settable resistance circuit 124. In some instances in which the above-referenced resistance-based circuits are implemented in the settable resistance circuit 124, the coding circuit detects respective resistances coupled via the input port and the settable resistance.

Figure 2:
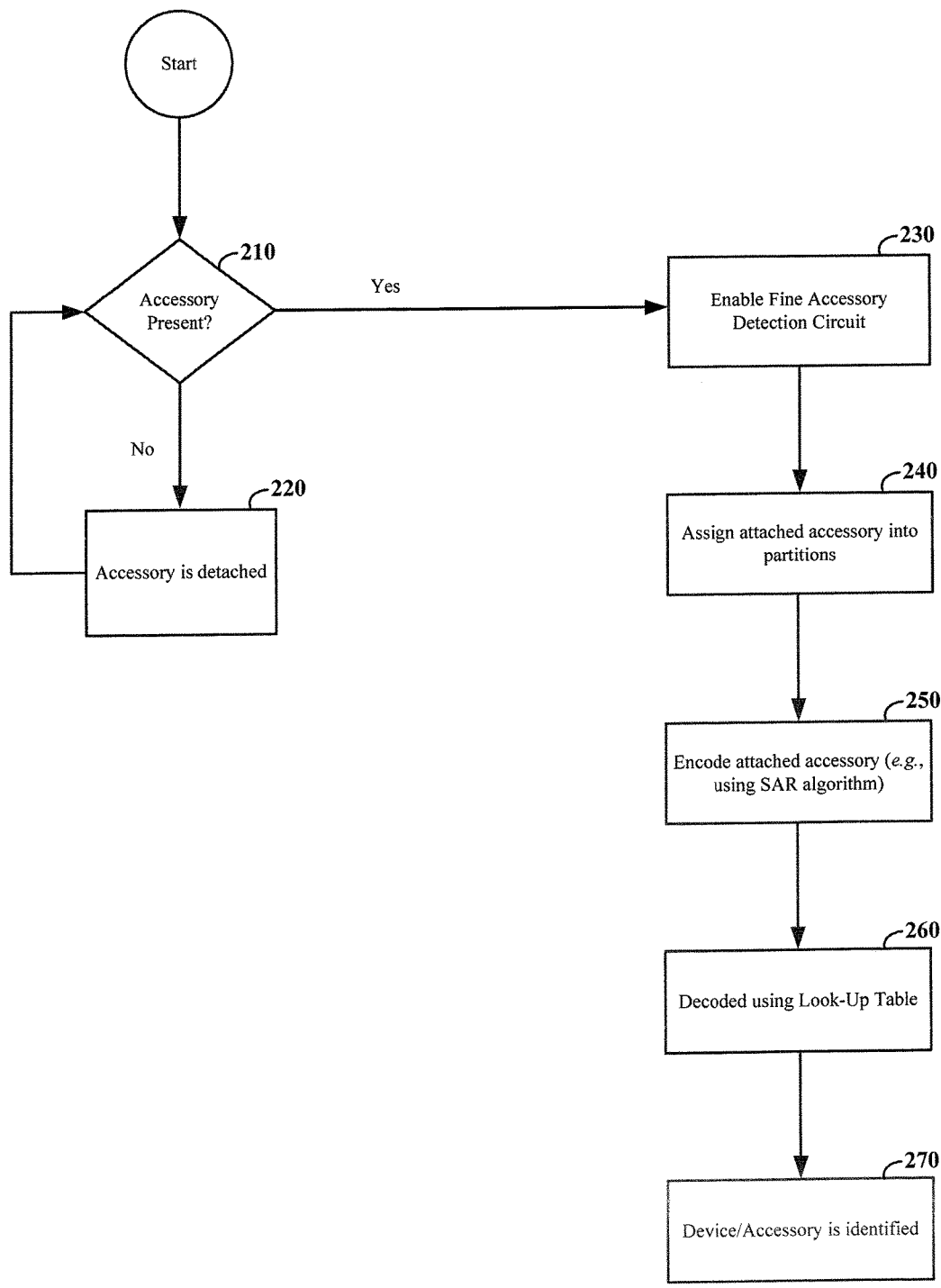
FIG. 2 shows a method for interfacing with a plurality of different types of devices, in accordance with another example embodiment.

FIG. 2 shows a method for interfacing with a plurality of different types of devices, in accordance with another embodiment. The method shown in FIG. 2 may, for example, be implemented in accordance with the apparatuses shown in FIG. 1, 3 or 4. At block 210, a coarse accessory detection circuit operates to detect whether an external circuit is attached to an interface/input port. If an accessory is not attached (or becomes detached), the detachment as noted at block 220 is detected and the process continues to monitor for attachment of an accessory (e.g., by polling). If an accessory is detected as being present at block 210, the process proceeds at block 230 in which a fine accessory detection circuit is enabled. In these contexts, the accessory attachment or detachment may, for example, be detected by determining whether the interface/input port is open or closed, and by presenting a logic high or low signal, indicative of the attachment (or lack thereof).

Once the fine accessory detection circuit is enabled, the attached accessory is assigned into partitions by trimming or adjusting resistor-based circuits relative to a pull-down resistance provided by the accessory. Once assigned, the accessory is encoded, such as by using a SAR (successive approximation register) algorithm. This may, for example, be implemented by operating a resistor to convert an analog signal from the accessory into a voltage, and generating a series of bits that approximates the voltage drop relative to resistor-based circuits. The encoded signal is then decoded using a look-up table at block 260, such as by matching the code to predefined codes that are each set for a specific device type, or matching the code in connection with a known partition (resistance range) as noted at block 240. If a match is found, the attached accessory or device is identified using the match in the look-up table, at block 270. This information may be used, for example, in communicating with the accessory/device.

Figure 3:
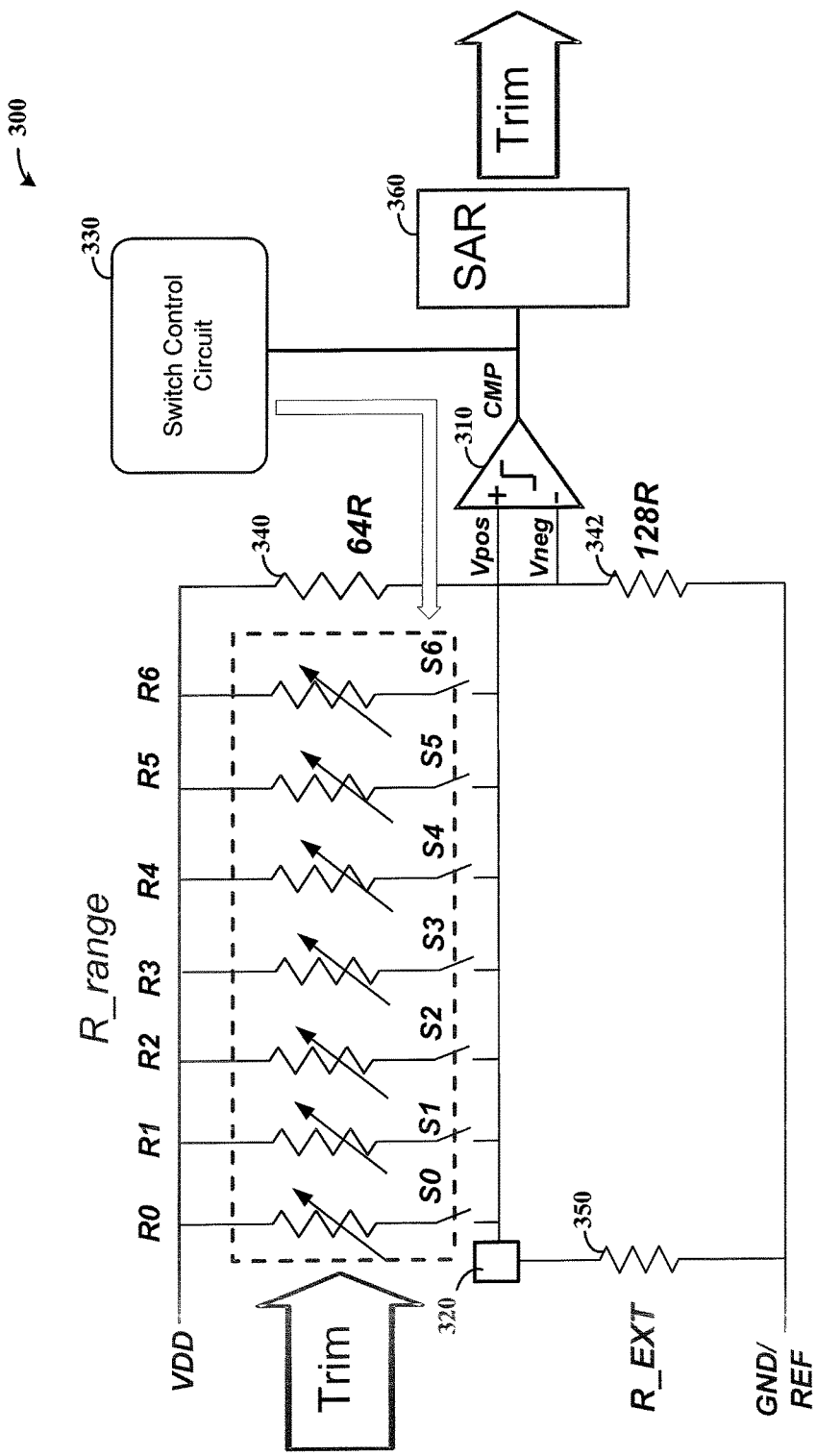
FIG. 3 shows an interface apparatus involving a resistor trimming circuit, in accordance with another example embodiment.

FIG. 3 shows an apparatus 300 involving a resistor trimming circuit, in accordance with another example embodiment. The apparatus 300 includes a comparator 310 coupled to an input port 320 and a plurality of resistor-based circuits R0-R6 respectively coupled between a supply (VDD) and a first input of the comparator via switches S0-S6. A switch control circuit 330 controls each of switches S0-S6, for selectively coupling each resistor-based circuit R0-R6. Resistors 340 and 342 are coupled between VDD and a reference/ground node, with a node between the resistors being connected to a second input of the comparator 310. Notably, various embodiments are directed to the implementation of additional or fewer resistor-based circuits.

An external resistance 350 is coupled to the input port 320, and a trimming process is carried out by an SAR circuit 360. For instance, the external resistance may be implemented with off-chip discrete high precision resistors with less than 1% variations. During the trimming process, the switch control circuit 330 generates a control signal that turns on the respective switches (S0, S1 . . . S6) sequentially. The SAR circuit 360 compares the value on its first input (Vpos) with a value on its second input (Vneg), which provide an indication as to when the sequential trimming provides a transition over which a value of each respective resistor-based circuit (R0-R6) is half of external resistance 350 (corresponding to a ratio set by resistors 340 and 342). Accordingly, the external resistance 350 is provided at two times a target resistance of resistance-based circuits (R0, R1 . . . R6), respectively. This trimming process can be implemented to minimize each resistor-based circuit's variation to within 1% over fabrication process.

Figure 4:
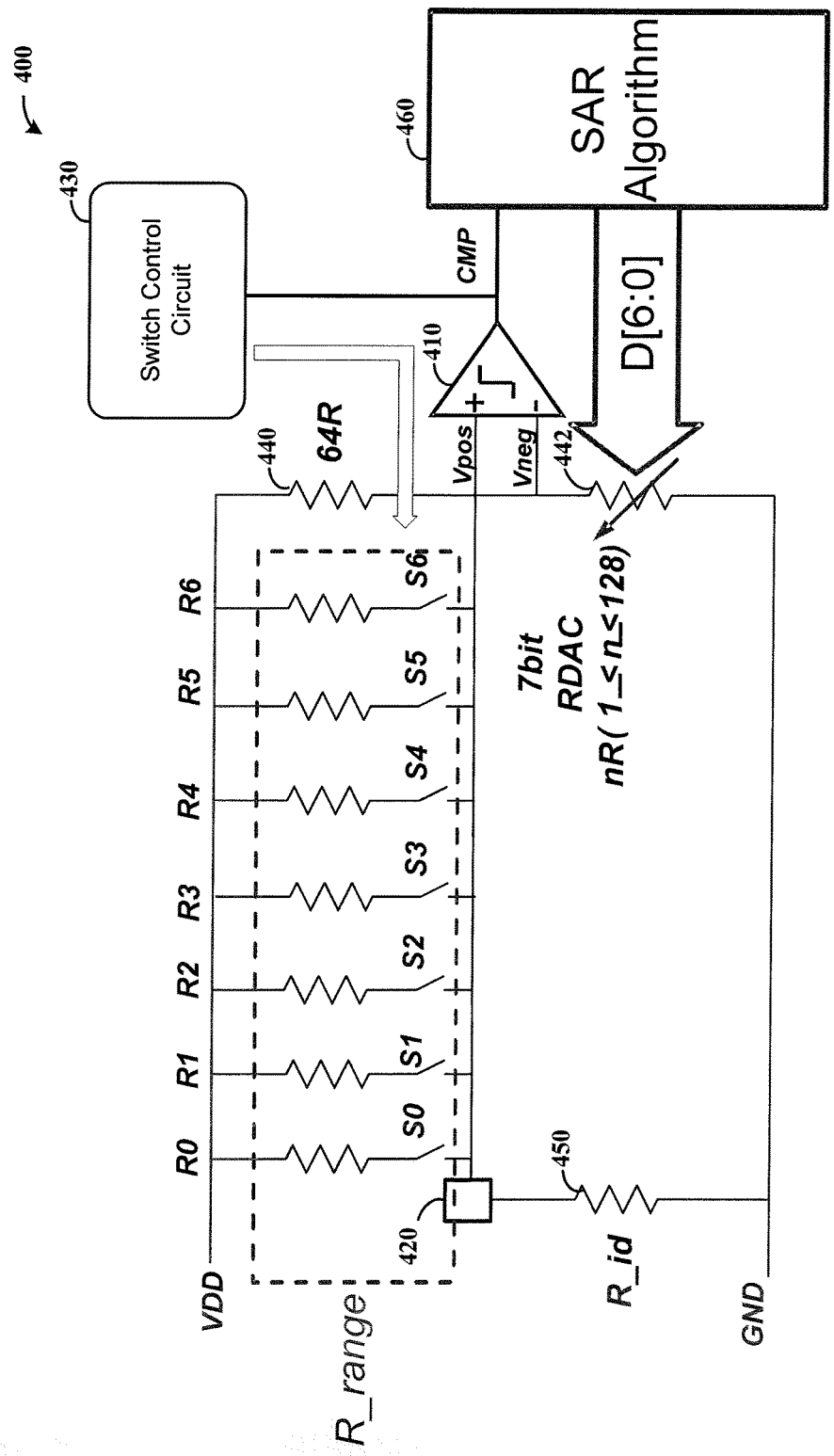
FIG. 4 shows an interface apparatus involving an accessory detection circuit, in accordance with another example embodiment.

FIG. 4 shows an apparatus 400 involving an accessory detection circuit, in accordance with another example embodiment. The apparatus 400 is similar to that shown in FIG. 3, with a comparator 410 coupled to detect a resistance of an external device (represented by 450) presented on an input port 420. Resistor-based circuits R0-R6 are trimmed, as discussed with FIG. 3, and coupled to a first input (Vpos) of the comparator 410 via switches S0-S6, controlled by a switch control circuit 430. A resistor 440 (e.g., as with resistor 340) sets a voltage at a second input (Vneg) of the comparator 410, together with a resistor 442.

By way of example, the resistor 442 is shown implemented as a resistive digital to analog converter (DAC), controlled by SAR circuit 460 (e.g., a default code for the 7 bit RDAC, implemented as resistor 442, may be 3 Fh (128 in decimal)). When an accessory (R_id) is plugged in, each of switches S0-S6 is sequentially closed while the other switches remain open. For each switch in the closed position, if the first input (Vpos) is higher than the second input (Vneg), the output of comparator is logic high, followed by opening the current switch and closing the subsequent switch. This comparison is repeated until the output of the comparator is logic zero (e.g., the second input is the same as or higher than the first input). If for a particular switch the output of the comparator is logic zero, the selected switch remains closed and is compared against a reference voltage presented at the second input of the comparator, the reference voltage being varied for determining selected bits. The resulting code represents the ratio of resistance provided on the input port and one of the resistance-based circuits R0-R6. For a 64 ohm resistor implemented at resistor 440, such a digital code, n, can be expressed in (1)

$$n \propto 64 \frac{R\_id}{R_{0,1,2\ldots 6}} \quad (1)$$

After the SAR algorithm is completed, based on the position of which resistance-based circuit is used, an embedded look-up table can be used to decode the digital code, n (e.g., into a 5 bit digital code).

Various embodiments are directed to a coarse detector that detects the presence of an external circuit connected to an input/interface port, high precision trimmed resistors (e.g., with less than 1% variation as noted above), a low offset (e.g., less than 1 mv) comparator, a digital to analog converter (e.g., 7-bit resistive DAC, or RDAC), and a digital SAR circuit. These components may, for example, be implemented with the trimming circuit and approach shown in FIG. 3, and the accessory detection circuit shown in FIG. 4.

According to a particular embodiment, the accessory detection circuit in FIG. 4 is implemented in accordance with the following. An input port (420) communicates power and data with different types of external circuits that respectively provide a resistance value (represented as R_id) at the input port that is different than resistance values presented at the input port by each other one of the plurality of different types of external circuits. A sorting circuit operates with comparator 410 and switch control circuit 430 to detect attachment of an external circuit (e.g., a hand-held device) to the input port 420 based on a resistance value presented by the external circuit on the input port. Once the attachment of the external circuit is detected, a tuning mode is entered in which a resistance range that includes the resistance value presented at the input port is identified by dynamically coupling one or more of resistor-based circuits R0-R6 via operation of switches S0-S6 by switch control circuit 430.

A coding circuit operates with the sorting circuit and comparator 410, SAR circuit 460 and resistor 442 (RDAC) to, based on the determined resistance value and using the resistor-based circuits, code a signal presented by the detected external circuit on the input port and identifying the type of the external circuit based on the coding. For instance, each of S0-S1 can be closed while others of the switches are closed, and the RDAC is operated relative to a resulting comparison as provided at comparator 410. The resulting output provides a binary digit, which can be combined for each switch and provides a resulting code. This code can be compared, for example, by the SAR circuit 460 in connection with stored data linking codes to device types, and used to identify a type of the external circuit.

Figure 5:
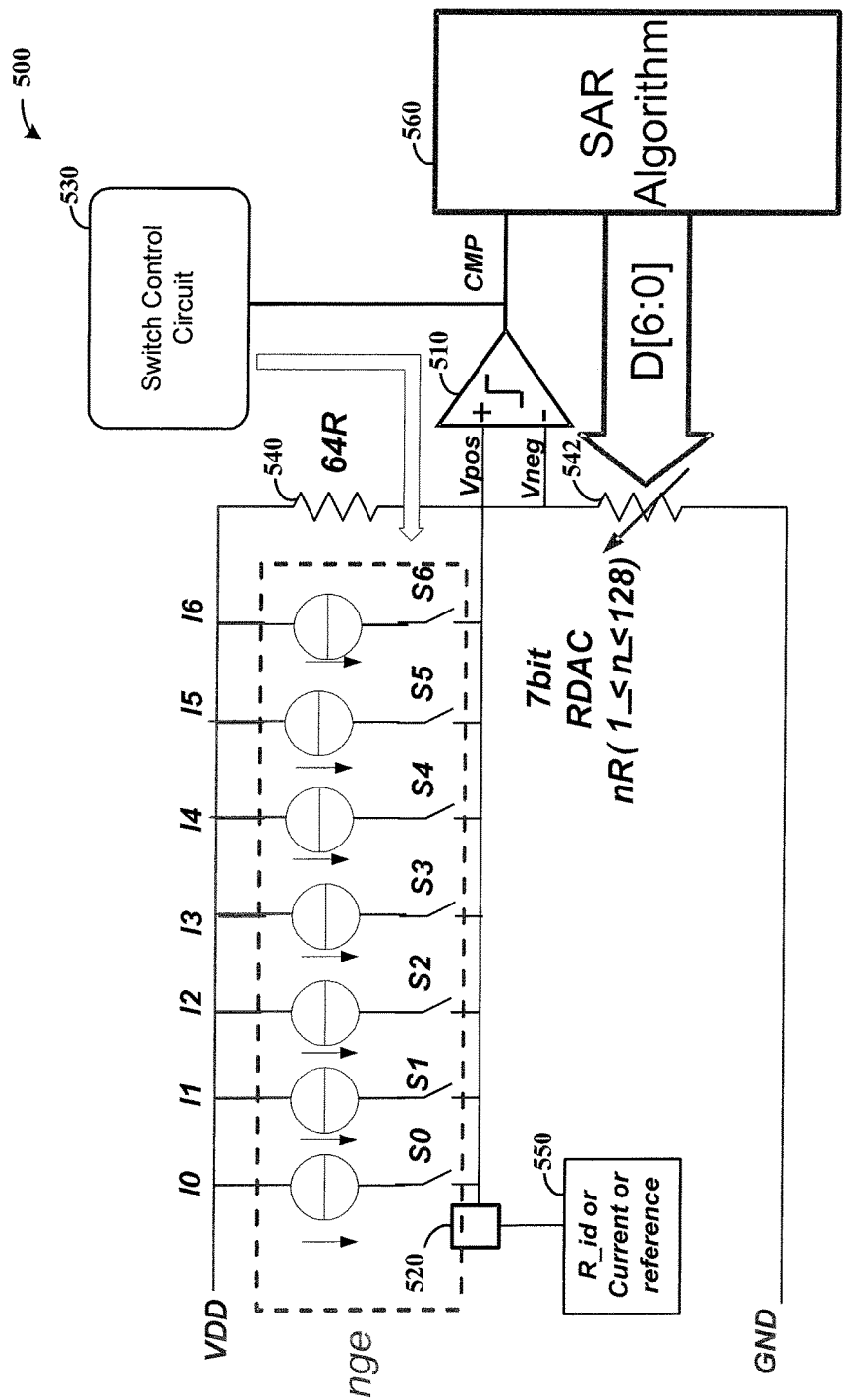
FIG. 5 shows an interface apparatus with current sources and related detection, in accordance with another example embodiment.

FIG. 5 shows an interface apparatus 500 with current sources and related detection, in accordance with another example embodiment. The apparatus 500 is similar to that shown in FIGS. 3 and 4, with current sources I0-I6 being used to facilitate detection of a current characteristic of an external circuit for identification of the external circuit. The operation of the apparatus 500 may be carried out in a manner similar to that as described above. For instance, each current source at I0-I6 may be calibrated using a reference current at block 550. The current sources I0-I6 can further be implemented to detect a type of external circuit (at block 550) connected to input port 520, by selectively controlling switches S0-S6 with the switch control circuit 530, comparing resulting voltages via comparator 510 and generating identification bits via SAR circuit 560 and resistor/RDAC 542 relative to resistor 540.

In addition, the various embodiments described herein may be combined in certain embodiments, and various aspects of individual embodiments may be implemented as separate embodiments. For instance, aspects of FIG. 1 involving connection detection, tuning and coding may be implemented in a common circuit, or in respectively separate circuits. Similarly, the SAR circuits 360/460/560 as shown in FIGS. 3, 4 and 5 can be operated with a logic circuit to carry out a variety of functions. Further, each of the circuits shown in FIGS. 3 4 and 5 can be implemented in a common circuit, to achieve functionality as noted.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., coding, trimming, varying resistance, or controlling switches). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, fewer or more resistance-based circuits may be used, different lengths of codes can be generated to identify circuits, variable resistors may be used in place of trimmable resistor circuits, and other types of comparisons can be carried out to effect device-type detection. Such modifications do not depart from the true spirit and scope of various aspects of the invention, including aspects set forth in the claims.

What is claimed is:
1. An apparatus comprising:
an input port configured and arranged to convey power and data relative to and for use by a plurality of different types of external circuits that respectively provide a resistance value at the input port that is different than resistance values presented at the input port by each other one of the plurality of different types of external circuits;

a first circuit configured and arranged to
in a first mode, detect attachment of one of the types of external circuits to the input port based on a resistance value presented by the external circuit on the input port; and
in response to detecting the attachment of the external circuit and the resistance value, switch from the first mode to a second mode, and while in the second mode, determine a resistance range that includes the resistance value presented at the input port by dynamically coupling one or more of a plurality of resistor-based circuits to the input port; and a second circuit configured and arranged with the first circuit to, based on the determined resistance range and using the one or more of the plurality of resistor-based circuits,
digitally code a signal presented by the detected external circuit on the input port based on the determined resistance range, and
after digitally coding the signal, identify the type of the external circuit based on the digital coding.

2. The apparatus of claim 1, wherein
the first circuit includes, for each of the plurality of resistor-based circuits, a switch configured and arranged to selectively couple the resistor-based circuits to the input port, and
the first circuit is configured and arranged to determine the resistance range by closing one or more of the switches and therein dynamically coupling one or more of the plurality of resistor-based circuits to the input port.

3. The apparatus of claim 2, further including the resistor-based circuits, wherein
each of the plurality of resistor-based circuits respectively exhibits different resistance values relative to other ones of the plurality of resistor-based circuits, and
the first circuit is configured and arranged to:
dynamically couple at least two of the plurality of resistor-based circuits to the input port,
for each respective switch coupled to one of the at least two of the plurality of resistor-based circuits, closing the switch, and comparing a resistance value on the input port to a reference resistance value, and
determine the resistance range based upon the comparing for each of the respective switches and a known resistance value of the at least two of the plurality of resistor-based circuits.

4. The apparatus of claim 2, wherein each resistor-based circuit includes a plurality of resistors, and the first circuit is configured and arranged to trim each resistor-based circuit by selectively coupling one or more of the plurality of resistors in the resistor-based circuit based on a predefined resistance presented at the input port.

5. The apparatus of claim 2, wherein each resistor-based circuit includes a variable resistor, and the first circuit is configured and arranged to trim each resistor-based circuit by varying a resistance of the variable resistor, based on a predefined resistance presented at the input port.

6. The apparatus of claim 2, wherein the first circuit is configured and arranged to trim the resistance value of the resistor-based circuits to a value that is within about 1% of a resistance value presented on the input port.

7. The apparatus of claim 2, wherein the second circuit is configured and arranged with the first circuit to digitally code the signal presented on the input port by,
for one of the respective switches,
closing the switch while maintaining the other ones of the switches open, and
comparing a resistance value corresponding to the input port and the switch with predetermined resistance values; and
generating a digital code having respective bits corresponding to the comparing.

8. The apparatus of claim 2, further including
a resistor divider circuit configured and arranged to provide a reference voltage, and
a comparator having a first input coupled to the input port and to the plurality of resistor-based circuits via the switches, and having a second input coupled to the reference voltage provided by the resistor divider circuit, the comparator being configured and arranged to
compare a voltage presented at the first and second inputs while the respective switches are sequentially connected, an
determine the resistance range in response to an output of the comparator transitioning values between respective ones of the switches being sequentially connected.

9. The apparatus of claim 1, wherein the second circuit is configured and arranged with the first circuit to digitally code the signal presented on the input port by generating respective bits corresponding to a comparison between a voltage corresponding to one of the plurality of resistor-based circuits and the input port, and a reference voltage generated for each of the bits, the value of the respective bits providing an indication of a digital code assigned to a particular type of the external circuit.

10. The apparatus of claim 1, wherein the second circuit includes a digital SAR (successful approximation register) circuit configured and arranged to vary a reference voltage at respective predetermined levels, and to digitally encode a signal presented by the external circuit into a binary code having respective bits corresponding to each predetermined level of the reference voltage.

11. The apparatus of claim 1, wherein the first circuit is configured and arranged to, prior to determining the resistance range, calibrate each of the resistor-based circuits by, for each resistor-based circuit,
coupling a known resistance to the input port,
comparing a voltage value corresponding to the known resistance and the resistor-based circuit to a reference voltage value, and
setting a value of the resistor-based circuit by trimming the resistor-based circuit based on the comparing.

12. A method comprising:
in a first mode, detecting attachment of an external circuit to an input port based on an electrical characteristic presented by the external circuit on the input port;
in response to detecting the attachment of the external circuit, switching from the first mode to a second mode,
while in the second mode, determining an electrical characteristic value range that includes a value of the electrical characteristic presented at the input port by dynamically coupling one or more of a plurality of circuits relative to the input port, and using the one or more of the plurality of circuits to provide the electrical characteristic at respective values;

based on the determined electrical characteristic value range and using the one or more of the plurality of circuits, digitally coding a signal presented by the detected external circuit on the input port based on the determined resistance range, and identifying a type of the external circuit based on the digital coding; and communicating power and data with the external circuit, based upon the digital coding.

13. The method of claim 12, wherein identifying the type of the external circuit includes comparing the digital coding with stored digital codes specifying a plurality of different types of external circuits that respectively provide a resistance value at the input port that is different than resistance values presented at the input port by each other one of the plurality of different types of external circuits, and identifying the type of the external circuit as being one of the plurality of different types stored in connection with one of the stored digital codes that matches the digital coding.

14. The method of claim 12, wherein dynamically coupling one or more of a plurality of circuits includes dynamically coupling one or more resistor-based circuits, further including calibrating each of the plurality of circuits by, for each circuit, coupling a known electrical characteristic value to the input port, comparing a voltage value corresponding to the known electrical characteristic value and the resistor-based circuit to a reference voltage value, and setting a value of the circuit based on the comparing.

15. The method of claim 12, wherein determining the electrical characteristic value range includes dynamically coupling one or more of a plurality of resistor-based circuits to the input port by closing one or more switches respectively coupling the resistor-based circuits to the input port, each of the plurality of resistor-based circuits respectively exhibiting different resistance values relative to other ones of the plurality of resistor-based circuits, for each switch, closing the switch while other ones of the switches are open and comparing, while the switch is closed, a resistance value on the input port to a reference resistance value, and determining the electrical characteristic value range as a resistance range based upon the comparing and a known resistance value of each of the plurality of resistor-based circuits.

16. The method of claim 15, wherein digitally coding the signal includes:

for each switch generating a bit corresponding to the determined resistance range, and combining the bits for each switch into a digital code; and identifying the type of the external circuit includes matching the digital code to a stored digital code identifying a particular type of external circuit associated with the stored digital code.

17. The method of claim 12, wherein digitally coding the signal includes:

coupling one of the plurality of circuits to the input port;

comparing a value corresponding to the input port and the one of the plurality of circuits with a predetermined value; and generating a digital code having respective bits corresponding to the comparing.

18. The method of claim 12, wherein digitally coding the signal includes generating respective bits corresponding to a comparison between a reference voltage and a voltage corresponding to one of the plurality of circuits and the input port, the value of the respective bits providing an indication of a particular type of the external circuit.

19. An apparatus comprising:

a first circuit configured and arranged to detect attachment of an external circuit to an input port based on a resistance value presented by the external circuit on the input port;

a second circuit configured and arranged to, in response to the first circuit detecting the attachment of the external circuit, determine a resistance range that includes the resistance value presented at the input port by dynamically coupling one or more of a plurality of resistor-based circuits relative to the input port; and a third circuit configured and arranged to digitally code a signal presented by the detected external circuit on the input port, based on the determined resistance range and using the one or more of the plurality of resistor-based circuits, and after digitally coding the signal, identify a type of the external circuit based on the digital coding, therein providing for communication of power and data with the external circuit that is based upon the digital coding.

20. The apparatus of claim 19, wherein the third circuit is configured and arranged to identify the type of the external circuit by:

comparing the digitally coded signal with stored digital codes specifying a plurality of different types of external circuits that respectively provide a resistance value at the input port that is different than resistance values presented at the input port by each other one of the plurality of different types of external circuits, and identifying the type of the external circuit as being one of the plurality of different types stored in connection with one of the stored digital codes that matches the coding.

* * * * *